Feb. 2, 1926.
F. L. FOOTE
HEADLIGHT DIMMING MEANS
Filed August 12, 1924
1,571,255
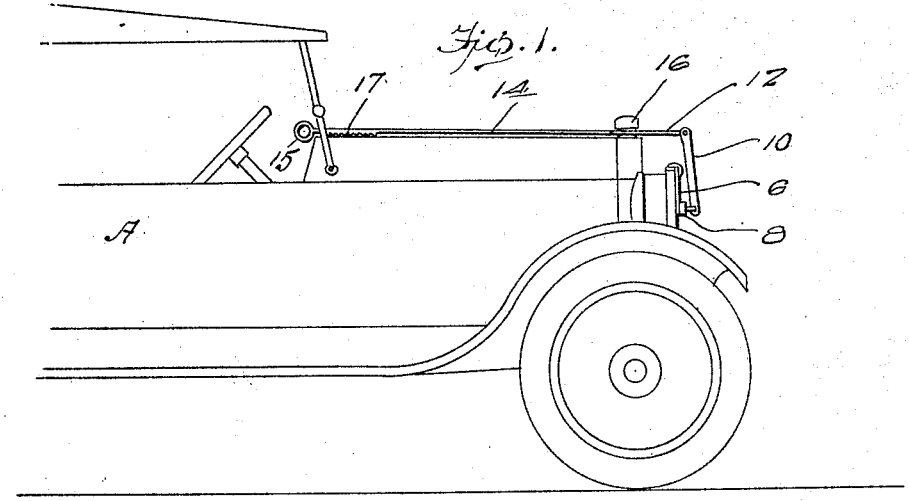
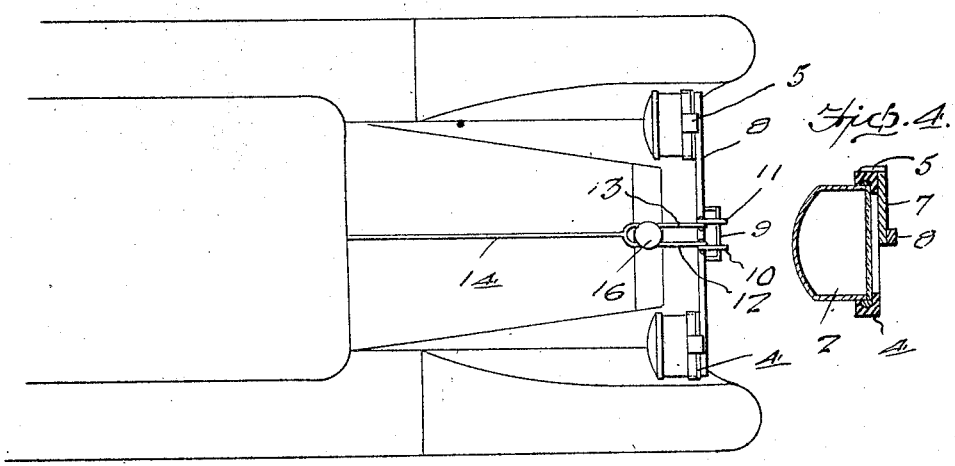
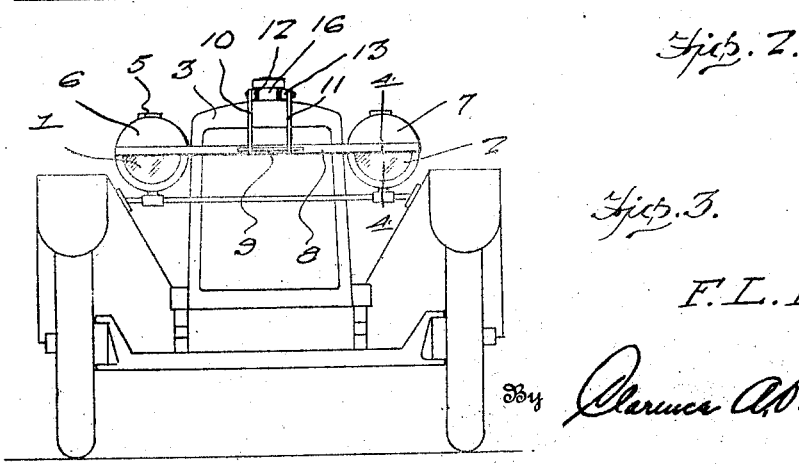
Inventor
F. L. Foote
By Clarence A. O'Brien
Attorney Patented Feb. 2, 1926.

1,571,255

UNITED STATES PATENT OFFICE.

FRANK L. FOOTE, OF BOY RIVER, MINNESOTA.

HEADLIGHT-DIMMING MEANS.

Application filed August 12, 1924. Serial No. 731,582.

*To all whom it may concern:*

Be it known that I, FRANK L. FOOTE, a citizen of the United States, residing at Boy River, in the county of Cass and State of Minnesota, have invented certain new and useful Improvements in a Headlight-Dimming Means, of which the following is a specification.

This invention relates to improvements in headlight dimming means and has for its principal object to provide a novel means for enabling the operator of a vehicle to manually actuate a pair of dimmers associated with the headlights of a motor vehicle for preventing the glare of the lights from interfering and confusing the operator of an approaching vehicle.

Another important object of the invention is to provide a headlight dimming means of the above mentioned character, which is of such construction as to enable the same to be readily and easily attached in position for use on motor vehicles without necessitating the alteration of any of the parts of the motor vehicle.

A still further object of the invention is to provide a headlight dimming means of the above mentioned character, which will prevent the glare of the headlights from affecting operators of approaching vehicles, yet enabling the lights to be deflected downwardly onto the road so that the same may be seen for a suitable distance in front of the motor vehicle on which the dimming means is mounted.

A further object of the invention is to provide a headlight dimming means of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of my improved invention showing the same in position on a motor vehicle.

Figure 2 is a top plan view thereof.

Figure 3 is a front elevation of the same, and

Figure 4 is a sectional view taken approximately on line 4—4 of Figure 3.

In the drawing wherein for the purpose of illustration is shown the preferred embodiment of my invention, the numerals 1 and 2 designate a pair of headlights which may be of any conventional construction and are mounted on the opposite sides of the radiator 3 in any manner well known in the art. Adapted to be detachably supported over a portion of each of the headlights is a rubber band or sleeve 4. Hingedly supported on the upper portion of each of the rubber bands or sleeves 4 as at 5 are the dimmer members 6 and 7 respectively. If desired, the dimmer members may also be formed of rubber and are substantially semi-circular in design so as to extend over the upper half of each of the headlights when in a closed position. This is more clearly illustrated in Figure 3 of the drawing.

A bar or rod 8 extends transversely across the front of the radiator 3 and affords a connection between the hinged dimmer sections 6 and 7, the rod or bar being designated by the numeral 8. The provision of the bar enables both of the dimmer sections to be operated simultaneously as will hereinafter be more fully described. Extending laterally from the intermediate portion of the bar 8 is the bracket 9 and secured at their lower ends to the bar are the links 10 and 11 respectively. The links are connected at their upper ends to the forked ends 12 and 13 respectively of a suitable elongated operating rod which extends rearwardly over the hood of the motor vehicle A and terminates in the handle 15 which is disposed within easy access to the operator of the vehicle. As is clearly illustrated in the drawing with reference more particularly to Figures 2 and 3, the forked forward end of the operating lever extends around the radiator filling cap 16 and the lever 14 is adapted for reciprocatory movement in the manner to be presently described.

The dimmer members 6 and 7 are in the position as shown in the drawing, the rays of light from the headlight being directed downwardly onto the road so that the operator of the vehicle may readily have the full view of the road for a suitable distance ahead of the motor vehicle. At the same time the dimmers will prevent the glare from the lights interfering with the driver of an approaching vehicle, thus preventing any possibility of a collision which may be caused by the glaring headlights. In order to raise the rays of light from the headlights, the lever 14 may be moved rearwardly by actuating the handle 15 causing the dimmer sections to be raised out of engagement with the upper portions of the headlight and the dimmer sections may be moved to any desired position and held at the desired angle with respect to the headlights by means of the rack teeth 17 on the lever 14.

The simplicity of my construction enables the same to be readily and easily attached in position on the headlights of a motor vehicle and will at all times be in a position to be readily operated by the operator of the vehicle.

Furthermore, the parts comprising my improved dimming means are so arranged as not to interfere with the operation of the motor vehicle and the same will at all times be positive and efficient in carrying out the purposes for which the same is designated.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

Headlight dimming means for motor vehicles; wherein the motor vehicle includes among other elements a radiator having a filling neck at its upper portion and headlights mounted adjacent the radiator; comprising a pair of dimmers, one hingedly mounted on each headlight, a bar connecting the dimmers, a push rod slidably mounted on the motor vehicle, and provided with a bifurcated end straddling the neck of the radiator, and a pair of links pivotally connected to the extremities of the bifurcated end of the bar, and pivoted to the bar connecting the dimmers.

In testimony whereof I affix my signature.

FRANK L. FOOTE.